E. V. WILKE.
TRAFFIC SIGNAL.
APPLICATION FILED JAN. 11, 1916.

1,324,633.

Patented Dec. 9, 1919.

Inventor
Edward V. Wilke,
By Thos. S. Anderman,
Attorney

UNITED STATES PATENT OFFICE.

EDWARD V. WILKE, OF SAN ANTONIO, TEXAS.

TRAFFIC-SIGNAL.

1,324,633.  Specification of Letters Patent.  Patented Dec. 9, 1919.

Application filed January 11, 1916. Serial No. 71,553.

*To all whom it may concern:*

Be it known that I, EDWARD V. WILKE, a citizen of the United States of America, and resident of San Antonio, in the county of Bexar and State of Texas, have invented certain new and useful Improvements in Traffic-Signals, of which the following is a specification.

This invention relates to signals which are especially adapted for use in connection with automobiles or other vehicles, the said invention having for its object the provision of novel means for indicating when the vehicle is to be turned and the direction of proposed travel; a further object being to provide novel means whereby the signals are manipulated, said means being within convenient reach of the operator of the controlling mechanism of the car.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
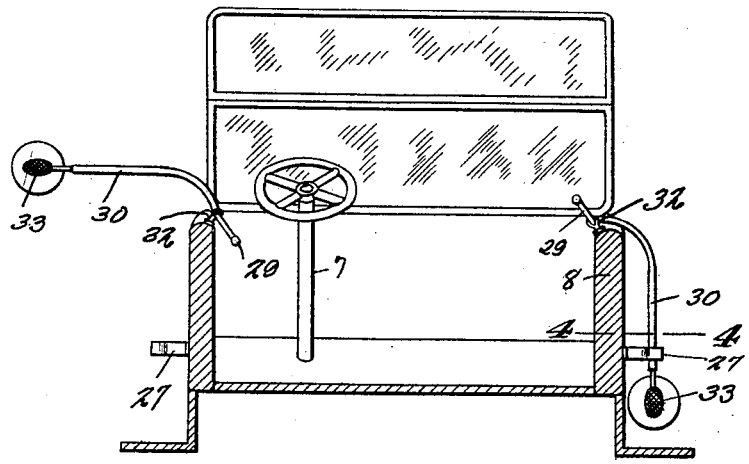
Figure 1 illustrates a sectional view of an automobile body with the signaling mechanism in elevation.
Figure 3:
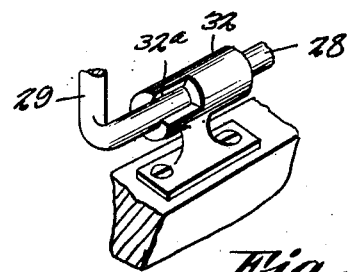
Fig. 3 illustrates a perspective view of a fragment of the signal operating mechanism and the journal bearing therefor.
Figure 2:
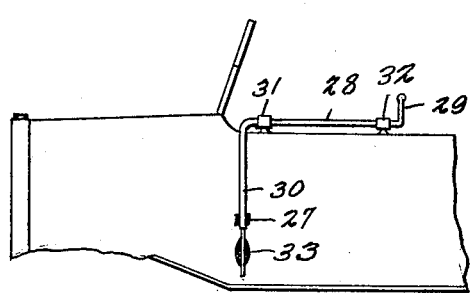
Fig. 2 illustrates a view in elevation of a fragment of an automobile having the invention applied, the same being on a reduced scale.
Figure 4:
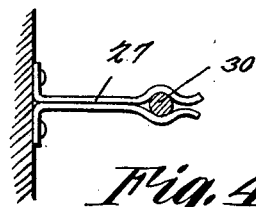
Fig. 4 illustrates a sectional view on the line 4—4 of Fig. 1, omitting the signal.

In these drawings 7 denotes a supporting post and 8 an automobile body showing the upper edge of the body supplied with journal bearings 31 and 32 in which the shaft 28 is journaled, the shaft 28 having an arm 30 at one end terminating in a signal 33, which is moved from vertical to horizontal position as the shaft 28 is partially rotated. The journal bearing 32 is provided with a notch 32$^a$ at one end so that the shaft may be slid longitudinally and the crank 29 of said shaft may enter the notch or recess and while in such position, the shaft will not rotate.

A clip 27 is attached to the body at each side and they are intended to engage the arms 30 when they are in their lowermost position of adjustment.

I claim—

In a traffic signal, a crank rotatably and slidably mounted on the side edge of an automobile body, journal bearings carrying the crank, one of said journal bearings having a longitudinal slot extending from its end and adapted to receive the crank when said crank is slid into the slot, thereby locking it in a horizontal position, and an arm carried by the crank at an angle thereto having a signal on the end thereof and extending out over the side of the automobile body.

In testimony whereof, I affix my signature in the presence of two witnesses.

EDWARD V. WILKE.

Witnesses:
 PAT STEVENS,
 C. C. CHAFFE, Sr.